United States Patent
Ledesma et al.

(10) Patent No.: US 12,218,510 B2
(45) Date of Patent: Feb. 4, 2025

(54) LOAD-SHARING WITH INTERCONNECTED POWER GENERATION

(71) Applicant: General Electric Company, Schenectady, NY (US)

(72) Inventors: Carolina Ledesma, Querétaro (MX); Rene Graziano Torres, Querétaro (MX); Cesar Ulises Ortiz Gutierrez, Querétaro (MX); Mario Alfonso Trejo Chavez, Querétaro (MX)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 272 days.

(21) Appl. No.: 17/010,310

(22) Filed: Sep. 2, 2020

(65) Prior Publication Data
US 2022/0069587 A1    Mar. 3, 2022

(51) Int. Cl.
*H02J 3/46* (2006.01)
*F01D 15/10* (2006.01)
*H02J 3/38* (2006.01)

(52) U.S. Cl.
CPC .............. *H02J 3/466* (2020.01); *F01D 15/10* (2013.01); *H02J 3/381* (2013.01)

(58) Field of Classification Search
CPC .... F02C 9/00; F02C 9/42; H02J 3/381; F01D 15/10
See application file for complete search history.

(56) References Cited

U.S. PATENT DOCUMENTS

| | | | | |
|---|---|---|---|---|
| 3,902,076 A * | 8/1975 | Meyers | ..................... | H02J 3/46 307/57 |
| 5,973,481 A | 10/1999 | Thompson et al. | | |
| 8,106,633 B2 * | 1/2012 | Dozier | ..................... | H02J 3/38 307/81 |
| 8,818,565 B2 | 8/2014 | Karaca et al. | | |
| 9,520,819 B2 | 12/2016 | Barker | | |
| 2003/0102716 A1 * | 6/2003 | Schultz | ..................... | H02P 9/08 307/19 |
| 2008/0071427 A1 | 3/2008 | Szepek et al. | | |

(Continued)

FOREIGN PATENT DOCUMENTS

| | | | | |
|---|---|---|---|---|
| EP | 1798836 A1 * | 6/2007 | ................ | H02J 3/46 |
| WO | 2016126263 A1 | 8/2016 | | |

OTHER PUBLICATIONS

EP Extended Search Report for EP Application No. 21191572.3, dated Jan. 28, 2022 (9 pages).

(Continued)

*Primary Examiner* — Jason H Duger
(74) *Attorney, Agent, or Firm* — Fletcher Yoder, PC

(57) ABSTRACT

Systems and methods provide load sharing for maintaining a stable operation of a group of electrical power generators in different load sharing scenarios. Over an interconnect bus, a controller of a gas-turbine generator (GTG) receives an indication of power generated in a set of GTGs (including the GTG) that are part of a power network, and an indication of a status change of the power network. Based on the status change and the power generated, the controller of the GTG determines whether a change in power generated by the power network is to occur and a new power level to be generated by the GTG.

14 Claims, 5 Drawing Sheets

(56) References Cited

U.S. PATENT DOCUMENTS

| | | | | |
|---|---|---|---|---|
| 2008/0179959 | A1* | 7/2008 | Folken | H02J 3/38 |
| | | | | 307/80 |
| 2012/0175876 | A1* | 7/2012 | Pendray | H02J 3/46 |
| | | | | 290/41 |
| 2013/0140888 | A1* | 6/2013 | Edwards | H02J 1/10 |
| | | | | 307/20 |
| 2013/0342020 | A1 | 12/2013 | Blevins et al. | |
| 2014/0062199 | A1* | 3/2014 | Martinez | H02J 3/38 |
| | | | | 307/53 |
| 2016/0258363 | A1* | 9/2016 | Tiwari | F02C 9/42 |
| 2017/0271872 | A1 | 9/2017 | Ravikumar et al. | |
| 2018/0152022 | A1 | 5/2018 | Manson | |
| 2018/0175626 | A1* | 6/2018 | Gerdes | H02J 3/46 |

OTHER PUBLICATIONS

Ahmed Moudud et al., "Stability and Control Aspects of Microgrid Architectures—A Comprehensive Review," IEEE Access, IEEE Access, Aug. 6, 2020 IEEE, XP011804797, vol. 8, pp. 144730-144766, Aug. 6, 2020 (37 pages).

* cited by examiner

LOAD-SHARING WITH INTERCONNECTED POWER GENERATION

BACKGROUND

The subject matter disclosed herein relates generally to a module for load-sharing in a power generation system. Specifically, the module is used to maintain a stable operation of a group of electrical power generators in different load sharing scenarios.

Large industrial facilities, such as power plants, offshore drilling platforms, and oil rigs, may use multiple generators operating in a parallel configuration to maintain reliable electrical power supplies. To ensure power generation system stability, load sharing is used to distribute and share the loads evenly throughout the generators in the fleet. A centralized controller may be used to manage the load sharing and other parallel tasks. However, when the centralized controller is offline due to technical or environmental problems (e.g., extreme weather events), the parallel tasks may be inhibited, resulting in unevenly distributed loads among the generators and/or unstable power generation.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a method is provided. In accordance with this method, a controller of a gas-turbine generator (GTG) receives an indication of a status of another GTG over an interconnection bus. Based on the status of the other GTG, the controller determines a power level to be generated by the GTG and drives the GTG to output the power level.

In a second embodiment, a non-transitory, computer-readable medium storing instructions is provided. The instructions, when executed by one or more processors, cause the one or more processors to receive, at a controller of a gas-turbine generator (GTG), an indication of power generated in a set of GTGs (including the GTG) that are part of a power network. The instructions also cause the one or more processors to receive, at the controller, an indication of a status change of a switch in the power network, in which the status change includes a toggle of a connection of one of the set of GTGs to the power network or a connection of the power network to a grid, and the indication is received over an interconnect bus interconnecting a set of controllers corresponding to the set of GTGs. The instructions also cause the one or more processors to determine, based on the status of the switch and the power generated, whether a change in power generated by the power network is to occur. The instructions also cause the one or more processors to drive, using the controller, the GTG based at least in part on the determination of whether to change the power generated.

In a third embodiment, a system is provided. The system includes a controller that includes a memory storing instructions and a processor that is used to execute the instructions. The instructions, when executed by the processor, cause the processor to control power generation in a gas-turbine generator (GTG) in a power network that includes a set of GTGs. Specifically, the instructions, when executed by the processor, cause the processor to: receive an indication that another GTG of the set of GTGs is within a threshold of a maximum power generation of the other GTG, in which the indication is received over an interconnect bus that interconnects the controllers of the set of GTGs. The instructions also cause the processor to receive a command that the GTG is to be shut down and, based on the indication, prevent the shutdown of the GTG and send a warning to an operator.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
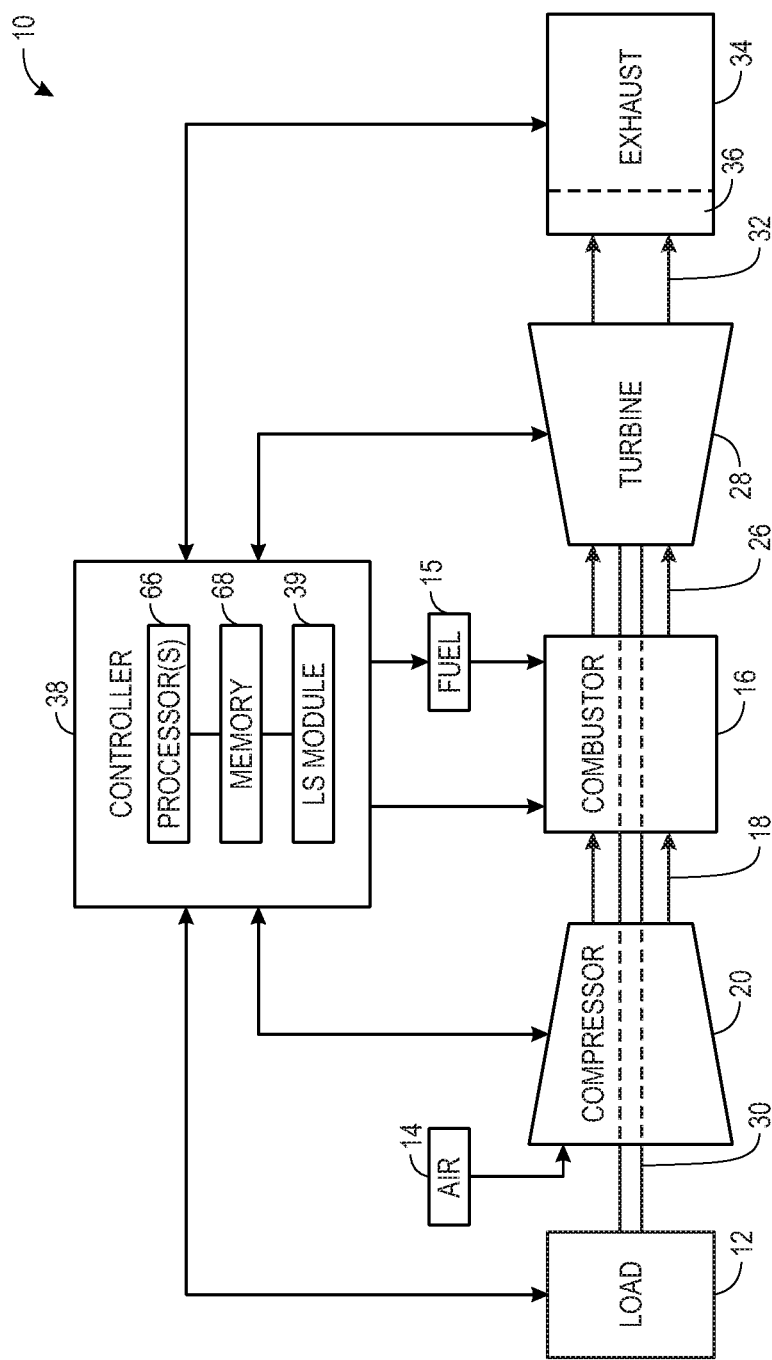
FIG. 1 is a block diagram of a gas turbine engine configured to power a load, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Power generation systems are used to convert energy sources into electrical power. The energy sources may be hydraulic, coal, natural gas, crude oil, nuclear, solar, or wind energy. Gas turbine (also called combustion turbine) power plants run on natural gas or liquid fuels. Gas turbine generators (GTGs) provide operational flexibility. For instance, the gas turbine is a type of internal combustion engine designed to meet increases in power demand quickly.

The main components in the GTG include an upstream rotating compressor(s), a combustor, downstream turbine(s) on the same shaft as the compressor(s), and a generator. Gas turbines are engines used for producing movement to turn electrical generators. The gas turbines are combustion engines that convert natural gas or liquid fuels to rotational mechanical energy, which further drives the generators to produce electrical energy. More specifically, the gas turbines draw in air, compress the intaken air, mix the air with fuel, distribute the air-fuel mixture into a combustor where combustions (triggered by ignitions) of the air-fuel mixture create hot pressurized gases to cause turbine blades to spin. The spinning of the turbine blades drives the generator that is connected (e.g., via a shaft) to the turbine blades to convert rotational energy into electricity.

Industrial facilities, such as factories, electric power plants, offshore oil platform or drilling rigs, may use multiple GTGs operating in a parallel configuration to maintain reliable electrical power supply levels. Systems using multiple GTGs may synchronize the GTGs where the GTGs are operating in parallel. As part of the synchronization, load sharing distributes and shares the load (e.g., proportionally/evenly) throughout the GTGs in the fleet. At least some of the GTGs in the fleet may have independent controllers communicating with a centralized controller (master controller). The master controller may manage the parallel tasks (including the load sharing) for the fleet. When the master controller is offline due to technical/environmental problems (e.g., troubleshooting, maintenance, or extreme weather event), the parallel tasks may be switched to manual operations executed by onsite operator(s) (e.g., using a switchboard configuration) or to a backup centralized controller, if available. However, using manual operations or backup centralized controller may increase the operational complexity that may result in reduced efficiency and/or increased cost.

The subject matter discussed herein relates to a load sharing modules that may be used to maintain stable operations of a group of GTGs in different load sharing scenarios. The reusable and flexible load sharing modules, located in one or more of the GTGs, are configured to select a control mode (such as a droop mode or an isochronous mode) of the respective GTG. The control modes are based on a status and/or other relevant information shared through communications among the GTGs in the group via an interconnection data bus. Therefore, a centralized controller or hierarchical control system for parallel tasks such as load sharing may be omitted and/or operations may continue when communications with the centralized controller fails. Additionally or alternatively, the load set point and other operation preference may be set by a third-party controller.

Turning now to the drawings, FIG. 1 is a block diagram of an embodiment of a gas turbine system 10. As an example, the gas turbine system 10 may be part of a combined cycle system and/or combined with other gas turbine systems 10 to power one or more loads 12. Specifically, the gas turbine system 10 is generally configured to drive the load 12 by combusting a mixture of compressed air and fuel 15 (e.g., natural gas, light or heavy distillate oil, naphtha, crude oil, residual oil, or syngas). The combustion is performed within a combustor 16, which may include one or more combustion chambers. Air 14 goes into an air intake at the compressor 20, is filtered, and is compressed in the compressor 20 via one or more compression stages.

To begin the combustion process within the combustor 16, the air 14 is injected into the compressor 20 through a compressed air stream 18. The compressed air stream 18 is mixed with fuel 15. Using the mixture of the fuel 15 and the air 14, ignition may occur. The ignition produces hot combustion gases 26 that power the gas turbine system 10. More specifically, the hot combustion gases 26 flow through a turbine 28 with one or more compression stages that drives the load 12 via a shaft 30. For example, the combustion gases 26 may apply motive forces (e.g., via convection, expansion, and the like) to turbine rotor blades within the turbine 28 to rotate the shaft 30. In an example process, the hot combustion gases 26 may force turbine blades in the turbine 28 to rotate the shaft 30 along an axis of the gas turbine system 10. As illustrated, the drive shaft 30 may be connected to various components of the gas turbine system 10, including the compressor 20 or the load 12.

As previously noted, the drive shaft 30 may connect the turbine 28 to the compressor 20 to form a rotor. The compressor 20 may include compressor blades coupled to the drive shaft 30. Thus, rotation of turbine blades in the turbine 28 may cause the drive shaft 30 connecting the turbine 28 to the compressor 20 to rotate the compressor blades within the compressor 20. This rotation of compressor blades in the compressor 20 causes the compressor 20 to compress air 14 to generate the compressed air stream 18. As previously noted, the compressed air stream 18 is then fed to the combustor 16 and mixed with other combustion components. The shaft 30 may drive the compressor 20 in addition to or in lieu of the load 12. As an example, the load 12 may be a generator of the GTG. Additionally or alternatively, the load 12 may include a propeller, a transmission, or a drive system, among others.

Once the turbine 28 extracts work from the hot combustion gases 26, a stream of exhaust gas 32 may be provided to an exhaust section 34, where the exhaust gas 32 may be cooled or further processed. For example, the exhaust section 34 may include a catalyst section 36 which includes a carbon monoxide (CO) catalyst, a NOx catalyst, an unburned hydrocarbon catalyst, and/or any similar metal-based catalyst (e.g., platinum-based catalysts). For example, in the illustrated embodiment, the catalyst section 36 may include a NOx catalyst that is configured to destroy NOx gases within the stream of exhaust gas 32 or a CO catalyst. The stream of exhaust gas 32 may then exit the exhaust section 34.

As illustrated, gas turbine system 10 includes a controller 38. The controller 38 may include one or more processors 66 and memory 68, which may be used collectively to support an operating system, software applications and systems, and so forth, useful in implementing the techniques described herein. Particularly, the controller 38 may include code or instructions stored in a non-transitory machine-readable medium (e.g., memory 68) and executed, for example, by the one or more processors 66 that may be included in the controller 38. The processor(s) 66 may receive parameters of operation from the various components (e.g., via one or more sensors) of the gas turbine system 10 including a shaft rotation speed, a frequency of electric power generated by the gas turbine system in a generator driven by the shaft 30, a voltage of the generated electric power, a demand from one or more load(s) 12, or other suitable parameters. In some embodiments, some parameters are measured directly while other parameters are determined indirectly from other measurements. For example, in certain embodiments, the controller 38 may utilize an algorithmic model or look-up table (e.g., stored in memory) to derive various parameters. The various parameters may include an operating speed of the shaft 30 or a connected GTG using electrical parameters. The electrical parameters may include a frequency or voltage of the electric power generated by the generator (e.g., the load 12). Further, the controller 38 may monitor operation of various parts of the gas turbine system 10. The monitored parameters may be used to control (e.g., adjust) operating parameters of one or more aspects of the gas turbine system 10.

As illustrated, the controller 38 includes a load sharing (LS) module 39 that may monitor and analyze the shared operational data (such as online/offline status, output power, frequency, or voltage, and the like) from the other online power generation systems (e.g., gas turbine generators) existing on the same power grid as the gas turbine system 10. Based on the monitoring and analysis, the load sharing module 39 may determine a suitable control mode (e.g., droop speed control mode) and/or an appropriate set point (e.g., frequency or voltage) that may contribute to stable operation of the gas turbine system 10 and/or connected grid(s). The load sharing module 39 may then cause the controller 38 to select the determined control mode and/or set point for the gas turbine system 10.

The controller 38 may receive the shared operational data from controllers of other power generation systems within multiple power systems (e.g., a set of gas turbine systems). The load sharing module 39 may include a physical circuit or may be at least partially embodied using the instructions stored in the memory 68 and running on the processor 66 of the controller 38.

Load sharing may be defined as a proportional division of the total load (e.g., in kilo-Watt (kW) or kilo-Volt-Ampere-Reactive (KVAR)) between multiple power generation systems on a power grid. Through intercommunications (e.g., via the controllers 38) among group(s) of GTGs serving a power grid, coordinated adjustments may be made to distribute and share the load of the power grid proportionally throughout the online GTGs. For example, when the load of the power grid increases, at least some of the online GTGs may increase power output with equal percentage to accept the load change. For example, a group of GTGs may operate in parallel to provide power for an offshore drilling platform. When one of the group of GTGs is offline, the other online GTGs may receive the offline signal through intercommunications, causing the controller(s) to calculate feasible new load distributions among the online GTGs, and increase the power output proportionally if the calculated new load distribution does not exceed a power rating of the online GTGs within the group. Additionally or alternatively, the controller(s) may invoke backup GTG(s) to share the load if the calculated new load distribution exceeds the power rating(s) of one or more online GTGs within the group.

Load sharing may be used by a power grid with multiple power generation systems and various loads to avoid overloading and/or stability problems. As previously noted, for tasks (such as load sharing) within the multiple power systems, the load sharing module 39 monitors the data from each of the fleet members even without a centralized controller and determines an appropriate way to contribute to a stable operation. In other words, the control mechanism described herein provides a distributed control system. The controller(s) (e.g., the controller 38) of two or more individual power generation systems receives an operating status and other relevant information from other power generation systems. The controller(s) of individual power generation system may make adjustment(s) based on the information provided by the other power generation systems. Such control mechanism enables flexible operations of the multiple power systems. For example, operations of one or more power generation systems (e.g., gas turbine system 10) may be adjusted to fit particular demands of gas turbines or site operations under normal and/or abnormal conditions, such as adjusting start or shutdown sequences and/or tying breaker operations.

As a reusable and flexible module, the load sharing module 39 may be pre-installed in the controller 38 during manufacturing of the gas turbine system 10, or may be post-installed in a controller of an existing power generation system (e.g., a backup gas turbine system for the multiple power systems) as a retrofit kit and/or software update. In one or more embodiments, implementation of the load sharing module 39 may involve no extra instrumentation than the already existing in a power generation system, enabling the any respective controllers 38 of power generation systems to perform the techniques discussed herein (e.g., with a software update).

The distributed power generation systems may use one of the following modes of operation: stand-alone operation, parallel operation with connection to a utility grid, and island operation. Each operation mode may be associated with specific controls for gas turbines (e.g., gas turbine fuel control) and/or for power generators (e.g., generator excitation control) within the power grid.

Figure 2:
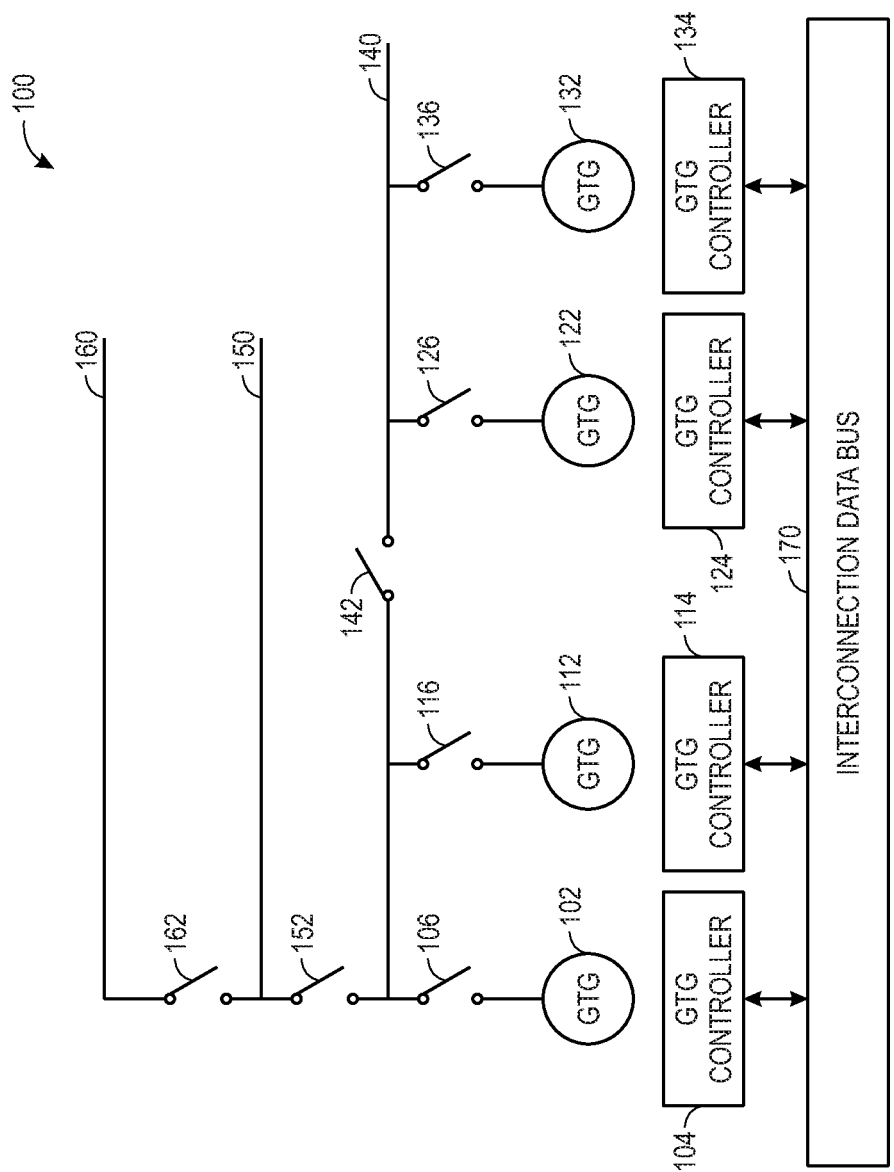
FIG. 2 is a block diagram depicting a power grid system including multiple gas turbine generators with controllers equipped with load sharing modules, in accordance with an embodiment.

With the preceding in mind, FIG. 2 depicts a power grid system 100 including a multiple gas turbine generators (GTGs) and respective GTG controllers. Each of the GTGs may operate in a specific mode (stand-alone, parallel or island) depending on power grid configurations, loads, electrical switch (or breaker) states, etc. All three modes of operation are possible due to opening/closing certain electrical switches in the configuration of the power grid system 100.

As illustrated, the power grid system 100 may include a main grid 160 (e.g., a utility grid), a local grid 150, and a power generator grid 140. The power generator grid 140 may include multiple GTGs 102, 112, 122, and 132, and respective GTG controllers 104, 114, 124, and 134. Any number (e.g., all) of the GTG controller 104, 114, 124, and 134 may include the load sharing module 39 as described in FIG. 1. The power grid system 100 may include an interconnection data bus 170 that is used to handle communications among the GTG controllers 104, 114, 124, and 134. Various electrical switches 106, 116, 126, 136, 152, and 162 may be used to toggle connections in the power grid system 100.

In stand-alone operation, a GTG is not connected with other GTGs and/or the main grid 160. For example, as illustrated in FIG. 2, when the electrical switches 152 and 106 are closed and the switches 162, 116, 142, 126, and 136 are open, the GTG 102 operates in a stand-alone operation. As an isolated power generation unit, the GTG 102 supplies power to connected loads on the local grid 150.

In one or more embodiments, a GTG working alone may be an emergency GTG when the local grid 150 loses power from one or more GTGs assigned to the local grid 150. For instance, in the example described above, the GTG 102 may start providing power for the local grid 150, which lost power from an assigned group of GTGs (e.g., GTGs 122 and 132). The stand-alone operation may include features such as controlling gas turbine fuel (e.g. the fuel 15 in FIG. 1) supply to raise/lower the output of the GTG 102, controlling excitation current to raise/lower the voltage output of the GTG 102, and other power management related procedures (e.g., keeping bus frequency and voltage constant for certain control modes), etc. In stand-alone operation, the total loads on the local grid 150 determines the GTG 102 output power.

In a parallel operation mode, the GTGs 102, 112, 122, and 132 operate in parallel to provide power to the main grid 160 and to the local grid 150. In some embodiments, the main grid 160 may be considered an infinite bus. For example, as illustrated in FIG. 2, when all the electrical switches 162, 152, 106, 116, 142, 126, and 136 are closed, the GTGs 102, 112, 122 and 132 enter into the parallel operation. Running in parallel, the GTGs 102, 112, 122 and 132 supply power to loads on the local grid 150 and/or the main grid 160.

In one or more embodiments, GTGs working in parallel operation may be organized into one or more subgroups of GTGs in a power plant. For instance, in the example described above, the GTGs 102 and 112 may form a subgroup A, and the GTGs 122 and 132 may form another subgroup B in the power plant. The two subgroups may work together to provide power for the local grid 150 and the main grid 160 or work when at least one of the subgroups are offline (e.g., due to maintenance). The parallel operation may include features such as controlling a gas turbine fuel supply to raise/lower active power of the GTGs 102, 112, 122, and 132, controlling excitation current to raise/lower the reactive power of the GTGs 102, 112, 122, and 132, controlling the difference between total power plant loads and GTG output power, and other power management related procedures (e.g., keeping power constant), etc. In parallel operation, the main grid 160 determines the operation parameters such as the frequency output, voltage output, and speed.

In an island operation, a GTG (e.g., GTGs 102, 112, 122, and 132) is connected with other GTGs, but the GTG is decoupled from the main grid 160. For example, as illustrated in FIG. 2, when the electrical switches 162 and 136 are open and the other electrical switches 152, 106, 116, 142, and 126 are closed, the GTGs 102, 112, and 122 operate in an island operation. Running in parallel, the GTGs 102, 112, and 122 supply power to all connected loads on the local grid 150.

In one or more embodiments, a group of GTGs working in the island operation may supply power to an isolated system such as a ship, an offshore drilling platform, or an oil production field in a desert. For instance, in the example described above, the GTG 102 and 112 may form a set of GTGs in a local power plant on an offshore drilling platform to provide power for the local grid 150 that may include all electrical devices/machines/equipment on the offshore drilling platform. At least one GTG (e.g., GTG 122) may serve as a backup GTG for emergency use only when one or more of the other GTGs (e.g., GTG 102 and 112) is offline. The island operation may include features such as controlling the gas turbine fuel to raise/lower the GTGs active power and bus frequency, controlling the excitation current to raise/lower the GTGs reactive power and bus voltage, and other power management related procedures (e.g., keeping bus frequency and voltage constant while sharing the load proportionally or cost-efficiently among the operating GTGs), etc. In island operation, the total loads on the local grid 150 may determine the sum of the power to be generated using operating GTGs.

To share information among a group of operating GTGs (either in the parallel operation or in island operation), the interconnection data bus 170 is used to handle communications among the GTGs 102, 112, 122, and 132 via GTG controllers 104, 114, 124, and 134. The interconnection data bus 170 may include multiple cables/wires (such as coax signal cables, Ethernet cables, and the like) and/or wireless connections, which carry signals containing information related to load sharing using any suitable communication protocol for communicating between controllers 38 of the GTGs 102, 112, 122, and 132. The load sharing information may include identification information for respective GTG or GTG controller ID, online/offline operating status information of respective GTGs, power output information for the respective GTGs, GTG configuration information (e.g., maximum power output), and the like. The interconnection data bus 170 serves as a common highway for communications through which the GTGs 102, 112, 122, and 132 share statuses and relevant information with the others via GTG controllers 104, 114, 124, and 134.

The controller 38 in each of the GTGs 102, 112, 122, and 132 may use one or more processors 66 to receive transmitted signals from the interconnection data bus 170 and store received information in the memory 68. The controller 38 of GTG may use the load sharing module 39 to monitor and analyze the operational data from the other online GTGs on the same grid and determine a control mode (e.g., droop mode, or isochronous mode) that may contribute to a stable operation of the entire grid. The load sharing module 39 may then cause the controller 38 to select the determined control mode for the specific GTG. Furthermore, after the new control mode or new set point is applied to the specific GTG, the controller 38 may use the load sharing module 39 to monitor the operational data from the other GTGs to evaluate/verify performance of the group of operating GTGs.

Each operation mode (e.g., stand-alone, parallel or island) of a power generation system on the power grid system 100 may be associated with specific control mode(s) for a group of GTGs within the power grid 100. As described previously, using the stand-alone load sharing module 39 in a control mechanism enables flexible operations of a group of GTGs. The flexible operations may include droop speed control mode for GTGs, isochronous speed control mode for GTGs, and/or other power control methods to accommodate different island topologies and events transitions, such as GTGs and/or other relevant units coupling to or decoupling from the power grid 100). Controlling power and speed for a group of GTGs relies on a coordinated effort based on a power demand on the group of GTGs, a number of GTGs available, parallel or island operation with particular topologies, and/or other relevant information especially during transient conditions and islanding events. Without coordination multiple GTGs operating in parallel may be subjected to unstable operations, for example, over-speed, losing speed reference, erratic power fluctuations, etc. Such unstable operations may cause unexpected power outages and/or lead to possible damage to GTGs or units on the power grid 100.

Figure 3:
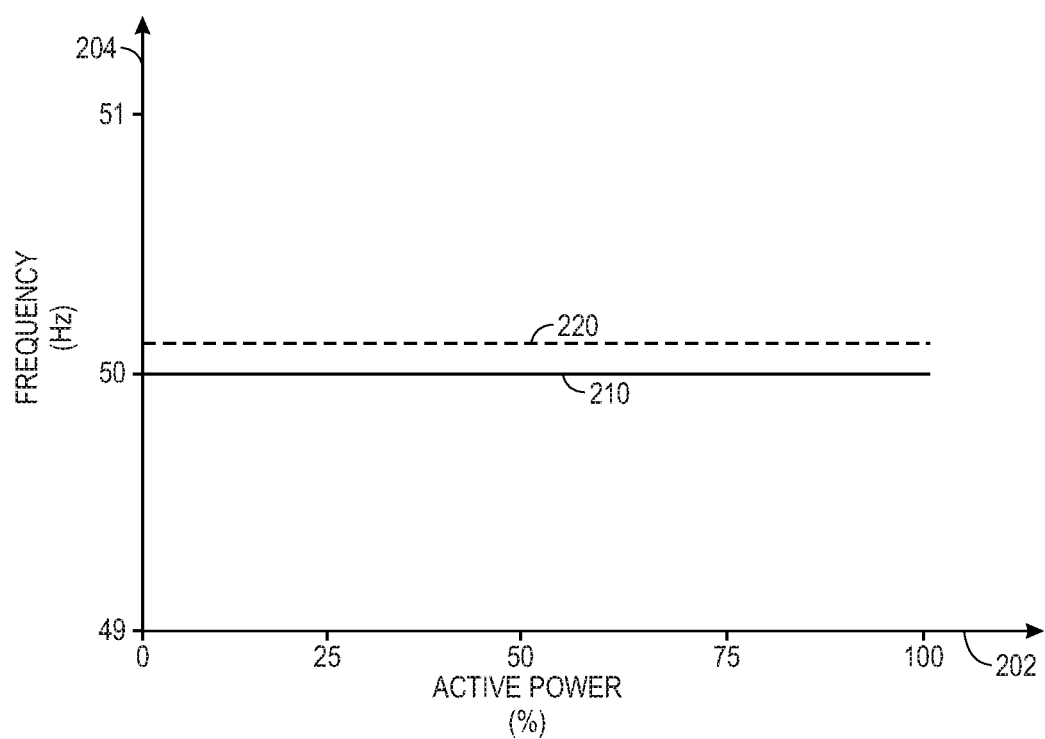
FIG. 3 is a frequency vs. power plot showing an isochronous speed control method that may be used by the multiple gas turbine generators of FIG. 2, in accordance with an embodiment.

FIG. 3 is a graph plotting active power 202*v*. frequency 204 for an isochronous speed control mode that may be used by the multiple GTGs of FIG. 2. For alternating current (AC) generators (including GTGs), the frequency (in Hz) is directly related to the speed (in RPM). As illustrated, in the isochronous speed control mode, a frequency line 220 of a GTG returns to an original set point line 210 (e.g., 50 Hz) after a load has been applied or rejected.

The isochronous speed control mode may be used when a GTG is in stand-alone operation, or the GTG is the largest (in power) unit in multiple GTGs (e.g., in the island operation). In the isochronous speed control mode, the energy generated by the prime mover (e.g., the gas turbine 28 in the gas turbine system 10) is regulated tightly in reaction to load changes. For example, an instant load increase (e.g. when a new load is added into an existing power grid) may cause a transient frequency decrease, but because energy is quickly regulated for the prime mover in the isochronous speed control mode, the frequency remains at or quickly returns to a set point. Likewise, an instant load decreases (e.g. when an existing load is removed from an existing power grid) may cause a transient frequency increase, but because the energy is quickly regulated for the prime mover in the isochronous speed control mode, the frequency is maintained at or quickly returned to the set point.

In other words, in the isochronous speed control mode, a GTG maintains a relatively constant speed regardless of the load changes. Certain issue(s) (such as instability) may arise when multiple GTGs in the isochronous speed control mode are operating on the same grid and the load changes frequently. For example, in FIG. 2, when the electrical switches 162, 152, 106 and 116 are closed, the GTG 102 and 112 provide power in parallel to the main grid 160. The main grid 160 may determine the frequency and voltage of the power generated by the GTG 102 or 112. When the speed set point is slightly lower, the controller 38 may cause a speed governor of a prime mover (e.g., the gas turbine 28) to adjust the gas turbine fuel supply (e.g., fuel 15) to lower the speed. Similarly, when the speed set point is slightly higher, the controller 38 may cause the speed governor of the prime mover to at least partially open the gas turbine fuel supply to raise the speed. Therefore, the power grid may experience relatively small but frequent fluctuations of frequency as the load changes frequently.

Figure 4:
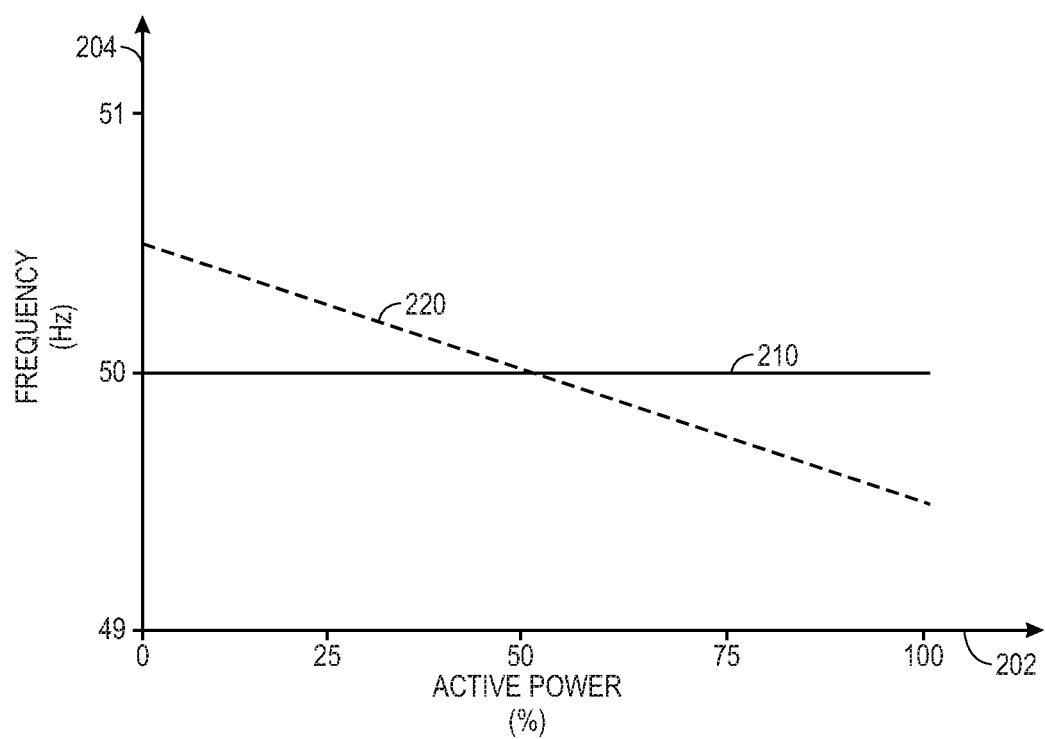
FIG. 4 is a frequency vs. power plot showing a droop speed control method that may be used by the multiple gas turbine generators of FIG. 2, in accordance with an embodiment.

When multiple GTGs are operating in parallel, a droop speed control mode may be used to avoid issues such as the fluctuations of frequency as load changes. FIG. 4 is a graph plotting active power 202 v. frequency 204 for a droop speed control mode that may be used by the multiple GTGs of FIG. 2. As illustrated, in the droop speed control mode, the frequency line 220 of a GTG decreases by a fixed percentage when the GTG is loaded from no-load (0%) to full load (100%). The fixed percentage (e.g., 4%) may be pre-determined based on the power grid configuration and the power rating of a GTG assigned to the power grid. An operator or a power management system may adjust the speed set point depending on operational parameters. The droop speed control mode may provide a stable working point for each load in case of the parallel operation in connection with the main grid 160.

The droop speed control mode may be used by AC electrical power generators to reduce a power output of a GTG as the line frequency increases. The droop speed control may be implemented by using the speed governor of a prime mover (e.g., the gas turbine 28) driving a synchronous GTG (e.g., the GTG 102, 112, 122, or 132) connected to a power grid (e.g., the power grid 100). It works by controlling the rate of power produced by the prime mover according to the grid frequency. The droop speed control mode enables synchronous GTGs to run in parallel so that loads may be shared among GTGs with the same or similar droop line(s) or curve(s). Moreover, droop curves used by a group of GTGs on an electrical power grid may be nonlinear or may be different from each other. For example, droop curves may be adjusted by operators in proportion to their power rating. Because the droop speed control mode accommodates changes in frequency, it enables multiple GTGs to work in tandem by dividing loads in proportion to their power. The droop speed control mode may be suitable when employed on power grids with multiple GTGs and/or when dealing with loads with higher degrees of power variance.

Figure 5:
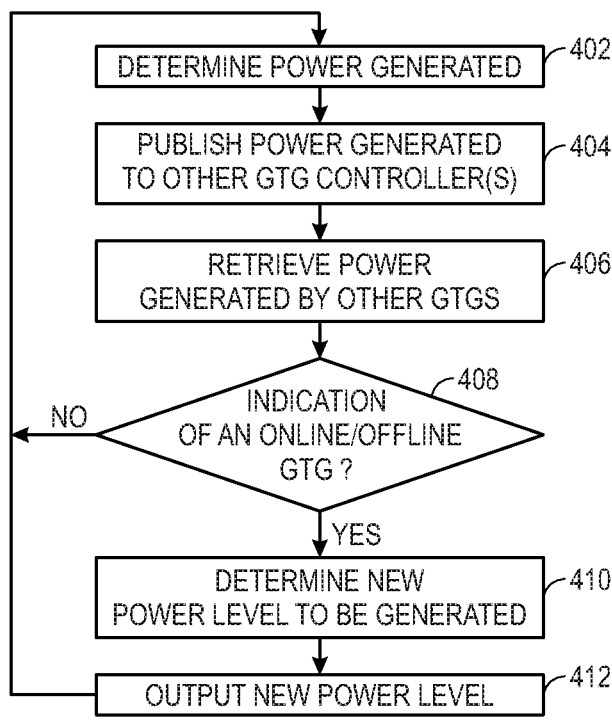
FIG. 5 is a flow chart depicting a load sharing process on one of the multiple gas turbine generators of FIG. 2 when another generator in the fleet is brought online or offline, in accordance with an embodiment.

FIG. 5 is a flow chart depicting a load sharing process for the power grid system 100 of FIG. 2 when a GTG in the power grid system 100 is brought online or offline. For example, in FIG. 2, when the electrical switches 162 and 136 are open, and the electrical switches 152, 106, 116, 142, and 126 are closed, the GTG 102, GTG 112 and GTG 122 are in parallel serving the local grid 150. The local grid 150 has a total load (e.g., 600 kW), the GTG 102, GTG 112 and GTG 122 may have power ratings (e.g., 400 kW, 200 kW, and 200 kW respectively). The total load of the local grid 150 is a percentage (e.g., 75%) of the total power ratings combined from GTG 102, GTG 112, and GTG 122 (e.g., 400+200+200=800 kW). As described previously, to achieve a load balancing operation, the power outputs of the GTG 102, GTG 112 and GTG 122 may be set to respective outputs (e.g., 300 kW, 150 kW, and 150 kW). In other words, the GTG 102, GTG 112 and GTG 122 may be driven to the same percentage (75%) load to reach load balancing. The GTG controller 104 (with the load sharing module 39) may determine power generated (block 402) on GTG 102 (300 kW). The GTG controller 104 may publish power generated to other GTG controllers (block 404) such as GTG controller 114 and GTG controller 124. The publication is made through the interconnection data bus 170. The GTG controller 114 and GTG controller 124 may determine the power generated on GTG 112 and GTG 122 respectively (e.g., 150 kW and 150 kW) and publish the power generated via the interconnection data bus 170. The GTG controller 104 may retrieve the power generated by other GTGs (block 406) such as the GTG 112 and GTG 122. The GTG controller 104 determines whether an indication of an online/offline GTG has been received (block 408) is received. For instance, the indication may be a signal from another controller indicating that a GTG corresponding to the other controller is going or has gone offline. Additionally or alternatively, the indication may include receiving no communications from the other controller for a period longer than a threshold duration, and/or lower power generated by an amount indicating that a GTG has gone offline. In the event that no indication is received, the GTG controller 104 restarts the load sharing process at block 402.

If at a particular moment, a GTG (e.g., GTG 122) is brought offline by opening a respective electrical switch (e.g., electrical switch 126), the GTG controller 104 and/or the GTG controller 114 receives the indication of an offline GTG. If the remaining GTGs (e.g., GTGs 102 and 112) are able to meet power demand of the local grid 150 that has a total load (e.g., 600 kW), the GTG controller 104 and the GTG controller 114 may determine new power level to be generated (block 410). For example, the GTG controller 104 and the GTG controller 114 may determine the power generated on GTG 102 and GTG 112 respectively (e.g., 400 kW and 200 kW). The GTG 102 and GTG 112 may receive instructions from the GTG controller 104 and the GTG controller 114 respectively to increase the power output to compensate the power supply loss due to the offline GTG 122. The instructions may cause the GTG 102 and GTG 112 to output new power levels (block 412). For example, the GTG 102 and GTG 112 may operate at new power levels (e.g., 400 kW and 200 kW) to meet power demand of the local grid 150. If the remaining GTGs (e.g., GTGs 102 and 112) are unable to meet power demand of the local grid 150 that has a total load (e.g., 700 kW), the GTG controller 104 and the GTG controller 114 may instruct the GTG 102 and GTG 112 to go offline because the total load on the local grid 150 is exceeding a total capacity of remaining GTGs.

Figure 6:
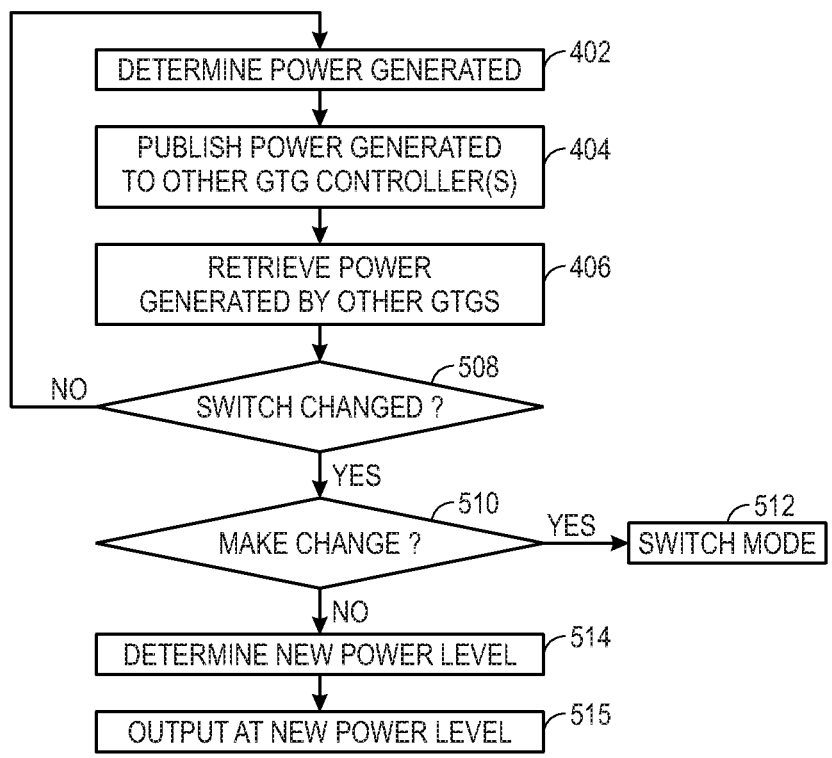
FIG. 6 is a flow chart depicting a load sharing process on one of the multiple gas turbine generators of FIG. 2 when an electrical switch changes state, in accordance with an embodiment.

FIG. 6 is a flow chart depicting a load sharing process for the power grid system 100 of FIG. 2 when an electrical switch changes state. For example, an event of the state changing (from OFF to ON state, or vice versa) may occur when a GTG is brought online or offline from operation by an operator via a switchboard, or when the electrical switch is tripped due to excessive electricity flowing through the electrical switch. The electrical switch state changing event may be reported to a power management system in the power grid system 100 where the electrical switch is installed. The power management system may publish the electrical switch state changing event to relevant power units (e.g., GTGs 102, 112, 122, and 132 of FIG. 2), which are equipped with communication devices (e.g., the GTG controller 104, 114, 124, and 134) to receive the published event from the power management system directly, or receive shared information related to the published event from the other power units via intercommunication (e.g., using the interconnection data bus 170).

The first three blocks 402, 404, and 406 of FIG. 6 are the same as FIG. 5. Using the example described previously, when the electrical switches 162 and 136 in FIG. 2 are open, and the electrical switches 152, 106, 116, 142, and 126 are closed, the GTG 102, GTG 112 and GTG 122 are in parallel serving the local grid 150. The GTG 102 may determine power generated (block 402), publish power generated to other GTG controller(s) (block 404), and retrieve power generated by other GTG(s) (block 406). If an electrical switch (e.g., electrical switch 162) is closed, a mode of operation may change. The GTG controller 104 may determine whether a state changing event has occurred (block 508). The GTG controller 104 may determine whether the state change corresponds to a change of mode at operation to make a change (block 510). For example, change of power grid configuration may correspond to change between modes (e.g., isochronous mode v. droop mode). For example, before the switch 162 is closed, the GTG 102 was connected to the local grid 150 with the other GTGs such as GTG 112 and GTG 122, forming an isolated system. As discussed previously, in the isolated system, the GTG 102, GTG 112, and GTG 122 work in the island operation to supply power to all connected loads on the local grid 150. Accordingly, the GTG 102 may be selected to operate in isochronous speed control mode to maintain a constant speed (frequency) regardless of the load changes on the local grid 150 (e.g., an oil field isolated from the nearby utility grid).

After connecting to the main grid 160, the GTG controller 104 may monitor and analyze relevant information whether to switch the speed control mode of the GTG 102. The relevant information may include the frequency and voltage of the main grid 160, the load changing in the main grid 160 and/or the local grid 150, the power generated by other online GTGs including GTG 112 and GTG 122, and the like. As mentioned previously, when the GTGs are in parallel operation with the main grid 160, and the load changes frequently, continuing working in the isochronous speed control mode may lead to instability issues as the GTGs in isochronous speed control mode will tend to maintain a constant speed regardless of the load changes. Based on the monitoring and analysis, the load sharing module 39 may determine a new suitable control mode that will contribute to a stable operation of the main grid 160. The load sharing module 39 may cause the GTG controller 104 to switch mode for the GTG 102 (block 512). For instance, the control mode of the GTG 102 may be switched from previous isochronous speed control mode to droop speed control mode so that the speed will decrease by a fixed percentage as previously discussed.

If the load sharing module 39 determines no change is to be made (block 510), the load sharing module 39 may determine a new power level (block 514) based on the load (on the main grid 160 and/or the local grid 150) and power output from the other GTGs (e.g., GTGs 112 and 122). The load sharing module 39 may cause the GTG controller 104 to change the set point of the GTG 102 to output at new power level to accommodate load changes in the power grid and/or power output changes for the GTGs (block 515).

Figure 7:
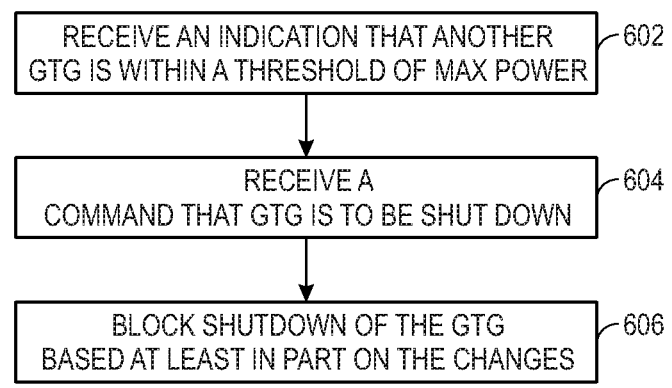
FIG. 7 is a flow chart depicting a load sharing process on one of the multiple gas turbine generators of FIG. 2 when a potential shut down situation may occur, in accordance with an embodiment.

FIG. 7 is a flow chart depicting a load sharing process for the power grid system 100 of FIG. 2 when a potential shut down situation may occur. As previously discussed, the GTG 102 and GTG 112 may form a subgroup A and the GTG 122 and GTG 132 may form a subgroup B in the power grid system 100 of FIG. 2. Each of the subgroups, and/or the power grid system 100 may perform coordinated operations. The GTGs 102, 112, 122 and 132 may provide power to meet a demand of the local grid 150, and/or the main grid 160.

If at a particular moment, an electrical switch (e.g., electrical switch 126) is tripped so that a GTG goes offline. Remaining GTG(s) in the subgroup or in the power grid system 100 may receive an instruction to increase the power output to compensate the power supply loss due to the offline GTG. The instruction may cause the remaining GTG(s) be left to meet a demand over their power ratings (e.g., 200 kW) but within the limit of maximum power (e.g., 220 kW). However, the remaining GTG(s) may not be recommended to operate within a threshold of maximum power (e.g., 95% of maximum power) for certain amount of time. A respective GTG controller (e.g., GTG controller 104) may receive an indication that another GTG (e.g., GTG 132) is within an impermissible/undesirable threshold of maximum power (block 602). The indication may also indicate that the other GTG will go offline after certain amount of time. Furthermore, the GTG controller may receive a command that a yet another GTG (GTG 102) is to be shut down (block 604) because the total load (e.g., 630 kW) on the local grid 150 is exceeding the total capacity of remaining GTGs (e.g., GTGs 102 and 112). By using the load sharing module 39 to analyze the indication that the other GTG is within a threshold of maximum power and other relevant information, the GTG controller 104 may determine to increase the power output of online GTG(s) other than the other GTG (GTG 132) (e.g., from 70% to 78.75% of the power rating(s)). Accordingly, the other GTG controller (GTG controller 134) may determine to decrease the power output (e.g., from 105% to 78.75% of the power rating) so that the projected offline situation will not occur. Furthermore, the GTG controller 104 may prevent shutdown of the GTG 102 based on at least in part on the changes (block 606). For example, maintenance may be delayed and/or shutdown conditions may change due to power production adjustment over the interconnection data bus 170. The GTG controller 104 may generate a waring and send the warning to an operator to indicate that the shutdown of the GTG 102 may be prevented.

The technologies described in present disclosure may be applicable to a variety of power generation systems (gas turbine generators, steam turbine generators, hydroelectric turbine generators, and the like). The load sharing module provides solutions for different load sharing scenarios, such as load sharing in isochronous mode, load sharing on islands that may include separable islands, load sharing in parallel mode when frequent load changes occurred, etc. Independent operation may be achieved as no master controller (centralized controller) is implemented and the GTG controllers (equipped with the load sharing module) may determine an appropriate way (e.g., a speed control mode) to contribute to stable operation based on the information provided by the others generators. The load sharing module enables flexible operation for a set of generators, which may be adjusted to fit particular needs of site operations in normal or abnormal conditions. For instance, when a GTG controller loses communication from other GTG controller(s), the GTG controller may instruct a corresponding GTG to maintain a mode in which the corresponding GTG is currently operating. Additionally or alternatively, the load set point and other operation preference (e.g., operation mode) may be set by customers via suitable device(s) such as a third-party controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of operating a plurality of generators each connected in parallel to a power generator grid by a respective switch and each having a respective controller, each of the respective controllers connected to one another in a decentralized manner over an interconnect bus, each controller of the respective controllers having a load sharing module, wherein the method comprises:
    monitoring shared operational data from all other generators of the plurality of generators with the load sharing module of each respective controller;
    analyzing the shared operational data with the load sharing module of each respective controller;
    selecting a control mode and an output set point for each of the plurality of generators with the respective controller based on the monitoring and the analyzing of the respective controller, the control mode being selected as one of a droop mode and an isochronous mode that is determined by the respective controller to contribute to stable operation of an entire grid system including the power generator grid, a local grid and a main utility grid;
    changing the control mode of a first generator of the plurality of generators from the isochronous mode to the droop mode with the respective controller in response to detecting a switch between the local grid and main utility grid has closed, the plurality of generators further including a second generator, third generator and fourth generator;
    instructing the fourth generator to increase power output with the respective controller in response to the third generator going offline;
    receiving an indication with the respective controller of the first generator that the power output of the fourth generator is within a threshold of maximum power and will therefore go offline after an amount of time;
    determining to increase power output by the first generator and the second generator with the respective controller of the first generator in response to receiving a command that the first generator will also shut down when the fourth generator goes offline after the amount of time due to total capacity of the first generator and the second generator being exceeded by a load on the local grid;
    increasing power output of the first generator and the second generator; and
    decreasing the power output of the fourth generator with the respective controller so that the fourth generator is no longer within the threshold of maximum power such that the fourth generator does not go offline after the amount of time and the first generator does not go offline.

2. The method of claim 1, wherein the shared operational data comprises a lack of an update from the respective controller of at least one of the plurality of generators over the interconnect bus for a threshold time.

3. The method of claim 1, wherein the shared operational data comprises a message from the respective controller of at least one of the plurality of generators over the interconnect bus.

4. The method of claim 1, wherein the interconnect bus comprises a wireless connection for each of the respective controllers.

5. The method of claim 1, wherein the shared operational data comprises an offline status.

6. The method of claim 1, wherein the shared operational data comprises an online status.

7. The method of claim 1, further comprising determining a generated power for each of the plurality of generators.

8. The method of claim 7, further comprising publishing the generated power of each of the plurality of generators to the interconnect bus.

9. The method of claim 8, further comprising the respective controller of each of the plurality of generators retrieving the generated power of the other generators of the plurality of generators published to the interconnect bus.

10. The method of claim 1, wherein the method is performed in response to communication with a centralized controller being lost.

11. Non-transitory, computer-readable medium storing instructions for operating a plurality of generators each connected in parallel to a power generator grid by a respective switch and each having a respective controller, each of the respective controllers connected to one another in a decentralized manner over an interconnect bus, each controller of the respective controllers having a load sharing module, wherein the instructions when executed by processors of the respective controllers are configured to cause the processors to perform the following operations:
    monitoring shared operational data from all other generators of the plurality of generators with the load sharing module of each respective controller;
    analyzing the shared operational data with the load sharing module of each respective controller;
    selecting a control mode and an output set point for each of the plurality of generators with the respective controller based on the monitoring and the analyzing of the respective controller, the control mode being selected as one of a droop mode and an isochronous mode that is determined by the respective controller to contribute to stable operation of an entire grid system including the power generator grid, a local grid and a main utility grid;

changing the control mode of a first generator of the plurality of generators from the isochronous mode to the droop mode with the respective controller in response to detecting a switch between the local grid and main utility grid has closed, the plurality of generators further including a second generator, third generator and fourth generator;

instructing the fourth generator to increase power output with the respective controller in response to the third generator going offline;

receiving an indication with the respective controller of the first generator that the power output of the fourth generator is within a threshold of maximum power and will therefore go offline after an amount of time;

determining to increase power output by the first generator and the second generator with the respective controller of the first generator in response to receiving a command that the first generator will also shut down when the fourth generator goes offline after the amount of time due to total capacity of the first generator and the second generator being exceeded by a load on the local grid;

increasing power output of the first generator and the second generator; and decreasing the power output of the fourth generator with the respective controller so that the fourth generator is no longer within the threshold of maximum power such that the fourth generator does not go offline after the amount of time and the first generator does not go offline.

12. The non-transitory and computer-readable medium of claim 11, wherein the respective switch is configured to disconnect the respective generator from the power generator grid.

13. The non-transitory and computer-readable medium of claim 12, wherein the shared operational data comprises a notification received over the interconnect bus.

14. A system comprising a plurality of generators each connected in parallel to a power generator grid by a respective switch and each having a respective controller, each of the respective controllers connected to one another in a decentralized manner over an interconnect bus, each controller of the respective controllers having a load sharing module, wherein the respective controllers are configured to perform the following operations:

monitoring shared operational data from all other generators of the plurality of generators with the load sharing module of each respective controller;

analyzing the shared operational data with the load sharing module of each respective controller;

selecting a control mode and an output set point for each of the plurality of generators with the respective controller based on the monitoring and the analyzing of the respective controller, the control mode being selected as one of a droop mode and an isochronous mode that is determined by the respective controller to contribute to stable operation of an entire grid system including the power generator grid, a local grid and a main utility grid;

changing the control mode of a first generator of the plurality of generators from the isochronous mode to the droop mode with the respective controller in response to detecting a switch between the local grid and main utility grid has closed, the plurality of generators further including a second generator, third generator and fourth generator;

instructing the fourth generator to increase power output with the respective controller in response to the third generator going offline;

receiving an indication with the respective controller of the first generator that the power output of the fourth generator is within a threshold of maximum power and will therefore go offline after an amount of time;

determining to increase power output by the first generator and the second generator with the respective controller of the first generator in response to receiving a command that the first generator will also shut down when the fourth generator goes offline after the amount of time due to total capacity of the first generator and the second generator being exceeded by a load on the local grid;

increasing power output of the first generator and the second generator; and decreasing the power output of the fourth generator with the respective controller so that the fourth generator is no longer within the threshold of maximum power such that the fourth generator does not go offline after the amount of time and the first generator does not go offline.

* * * * *